C. R. RINGS.
COMPUTING DEVICE.
APPLICATION FILED JUNE 6, 1916.

1,229,522.

Patented June 12, 1917.
4 SHEETS—SHEET 1.

WITNESS
O. Johnson

INVENTOR
Carl R. Rings
BY
C. D. Haskins
ATTORNEY

C. R. RINGS.
COMPUTING DEVICE.
APPLICATION FILED JUNE 6, 1916.
1,229,522.
Patented June 12, 1917.
4 SHEETS—SHEET 2.
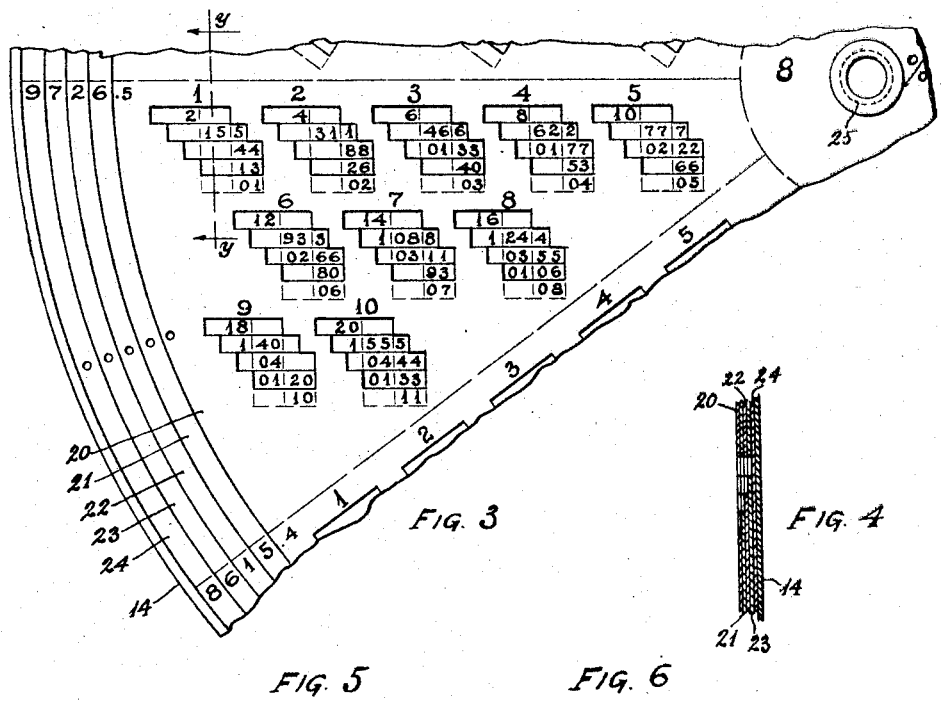
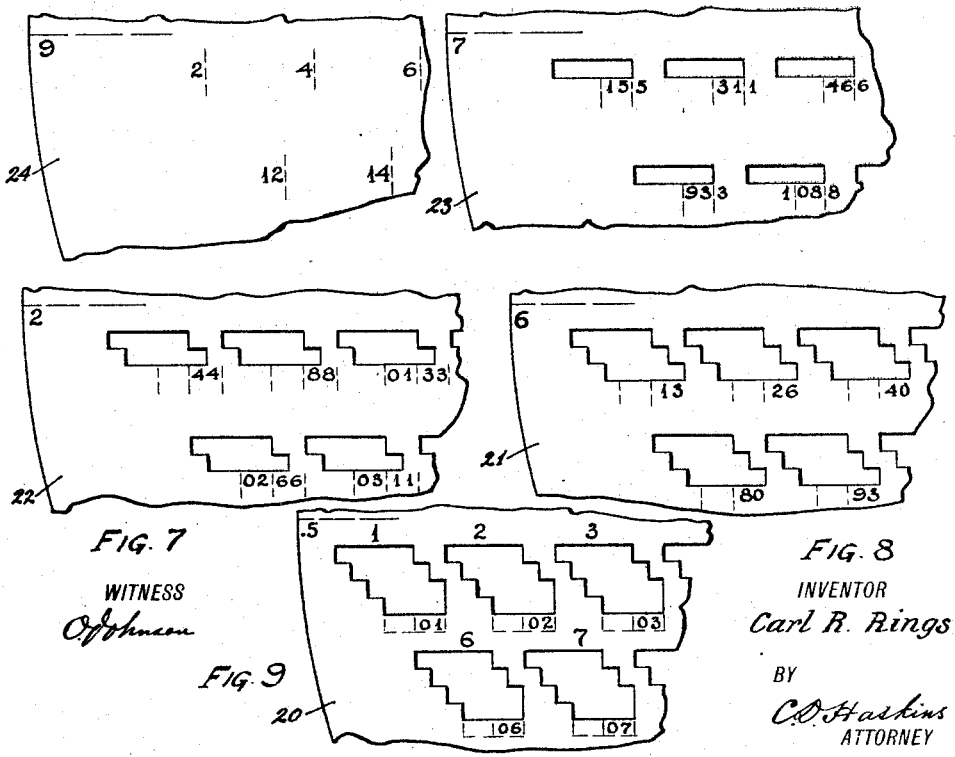
WITNESS
O. Johnson
INVENTOR
Carl R. Rings
BY
C. O. Haskins
ATTORNEY

C. R. RINGS.
COMPUTING DEVICE.
APPLICATION FILED JUNE 6, 1916.

1,229,522.

Patented June 12, 1917.
4 SHEETS—SHEET 3.

WITNESS
O. Johnson

INVENTOR
Carl R. Rings
BY
C. D. Haskins
ATTORNEY

UNITED STATES PATENT OFFICE.

CARL R. RINGS, OF MOUNT VERNON, WASHINGTON.

COMPUTING DEVICE.

1,229,522.  Specification of Letters Patent.  Patented June 12, 1917.

Application filed June 6, 1916. Serial No. 102,102.

*To all whom it may concern:*

Be it known that I, CARL R. RINGS, a citizen of the United States, residing at Mount Vernon, in the county of Skagit and State of Washington, have invented a certain new and useful Improvement in Computing Devices, of which the following is a specification.

My invention relates to improvements in computing devices, and the object of my invention is to provide a simple computing device embodying movable parts inscribed with numerals, which parts may be actuated to dispose certain ones of said numerals, which may represent any principal sum of money, in such relation to certain other ones of said numerals, which may represent any certain length of time, that other different ones of said numerals may be exposed to indicate sums representing the interest on said principal sum for said certain length of time; and a further object of my invention is to embody in such computing device two other movable parts upon which are inscribed the names of the twelve months of a year and numerals representing the days of each of said months and upon the other of which is inscribed numerals representing the 365 days of a year, which two other movable parts may be relatively moved to dispose a numeral representing zero days to register with a numeral representing the date of a promissory note, with the result that a numeral representing the date of maturity of such note will register with a numeral representing the number of days constituting the time period of said note.

Figures 1, 2:
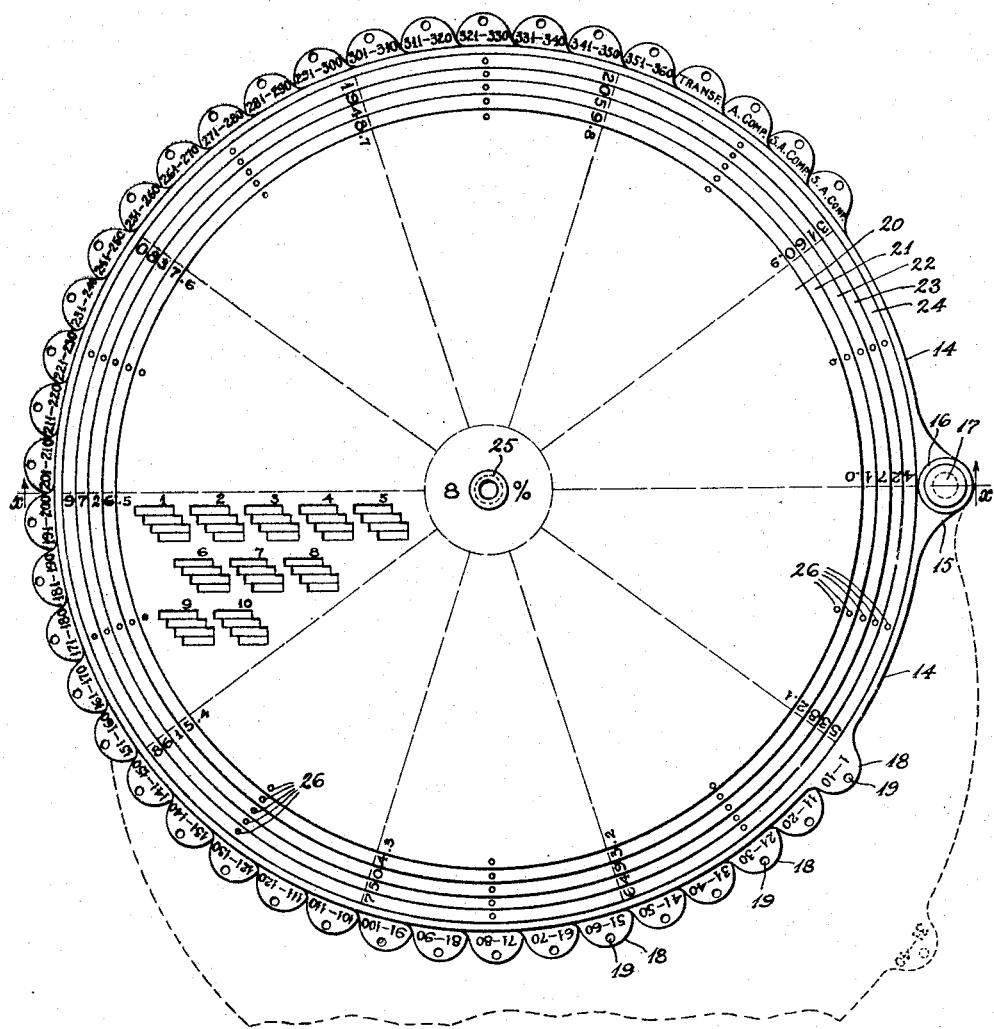
Figure 10:
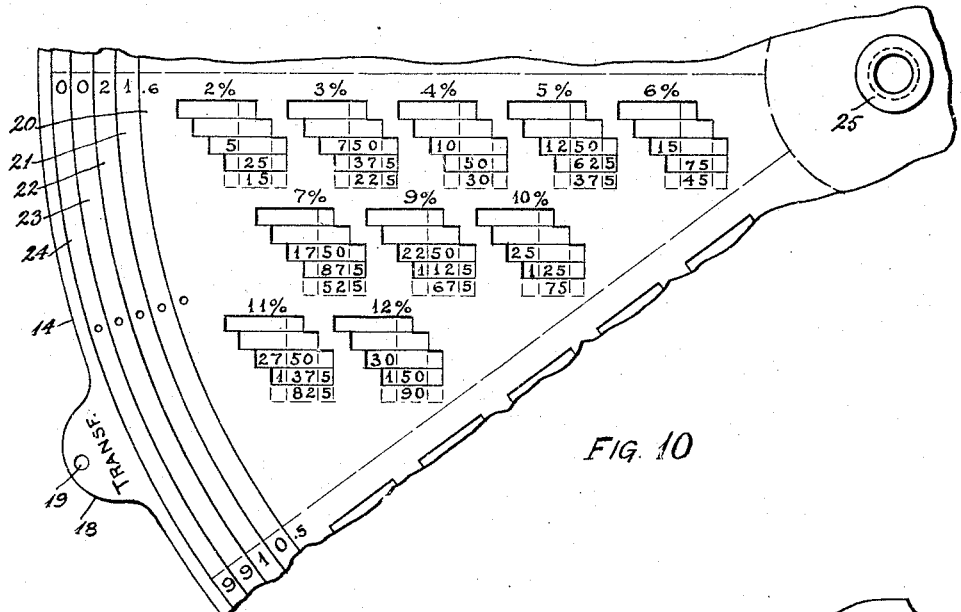
Figure 11:
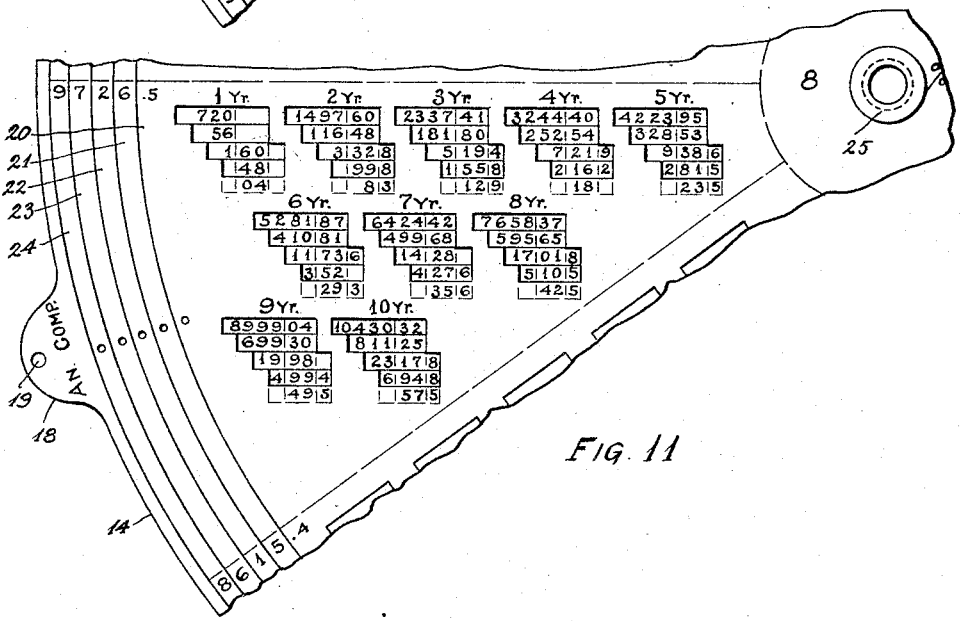
Figure 12:
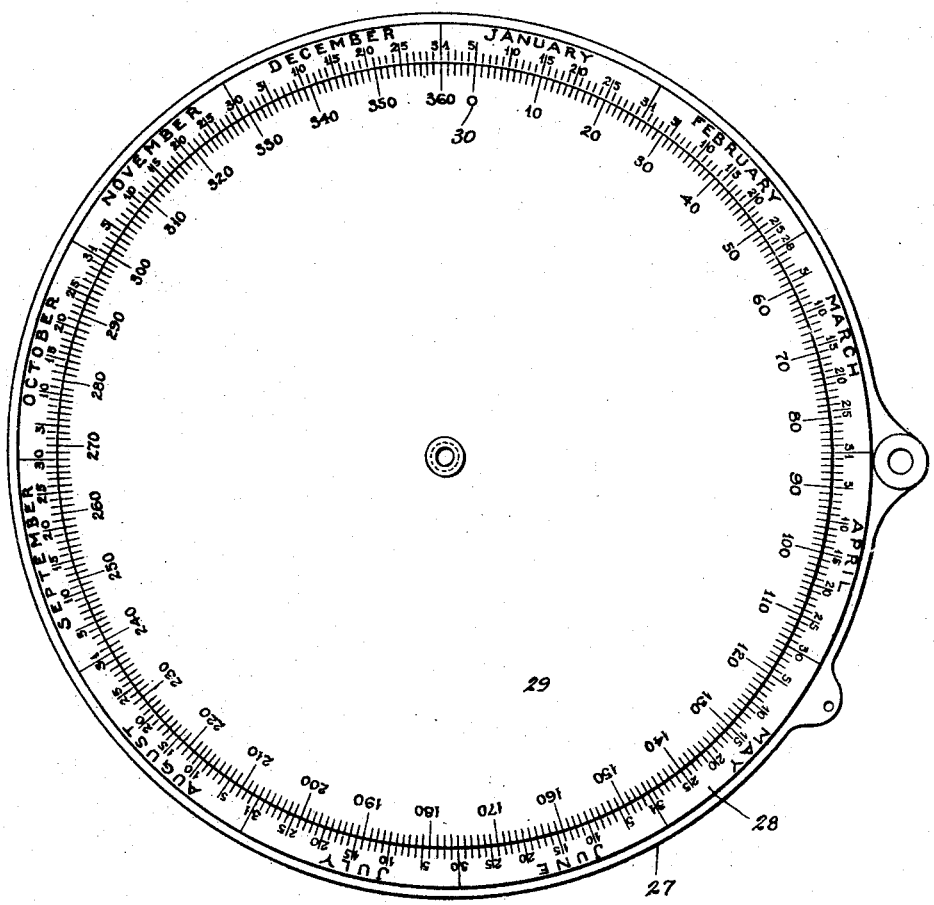

I accomplish these objects by devices illustrated in the accompanying drawings in which Figure 1 is a plan view of a structure embodying my invention; Fig. 2 is a fragmentary view of the same in vertical midsection on broken line *x*, *x* of Fig. 1; Fig. 3 is a plan view, on an enlarged scale, of fragments of some associated parts of the same showing the relative positions in which said parts may be placed in the operation of computing the interest on a certain sum of money for different periods of time from one to ten days at the rate of eight per cent.; Fig. 4 is a view of the same in vertical section on broken line *y*, *y* of Fig. 3; Figs. 5, 6, 7, 8 and 9 are plan views of corresponding fragments of five of the associated parts shown in Figs. 3 and 4; Fig. 10 is a plan view, on an enlarged scale, of fragments of other associated parts of the structure of Fig. 1; Fig. 11 is a plan view of different other associated parts of said structure shown in Fig. 1; and Fig. 12 is a plan view of a time computing device that may be associated with the structure of Fig. 1 to coöperate therewith in the process of determining the value, at any particular date, of a promissory note, the amount of its principal, its date and its rate of interest being given.

Referring to the drawings, throughout which like reference numerals designate like parts, forty plates, like plates 14, preferably of thin sheet metal, are each provided with an integral lug (like integral lugs 15 shown in Figs. 1 and 2) to which is soldered a boss, like bosses 16.

All of the forty plates 14 are articulated to a rod 17 which is freely disposed to extend through holes formed in the lugs and bosses 15 and 16 respectively, whereby said plates 14 may be parallel and concentric each with the others and be spaced each from adjacent ones at a distance equal to the height of its boss 16, as shown more clearly in Fig. 2, whereby a desired one of said plates 14 may be independently moved to swing edgewise on the rod 17 outwardly from the pile formed by said plates 14 to expose the whole of the front surface thereof.

Each of all of the forty plates 14 is also provided with an integral tab 18 which projects from its circular edge at a point which is at a different angular distance from the rod 17 than are the tabs 18 of the other plates 14, and each of thirty six of said tabs 18 is inscribed on its front side with numerals representing a different period of ten days, thus, as shown in Fig. 1, the first tab 18 nearest one side of the rod 17 bears the numerals 1–10 representing the first period of ten days, the second tab 18 bearing the numerals 11–20 representing a second period of ten days and the third tab 18 bearing the numerals 21–30 representing the third period of ten days, and in like manner on successive tabs 18 to and including the thirty six tabs 18 are inscribed increasingly higher numbers, the said thirty sixth tab 18 bearing the numerals 351–360, whereby thirty six of the forty plates 14 serve each to represent a different one of the thirty six periods of ten days which constitute a larger period extending over 360 days.

The succeeding four tabs 18 are inscribed respectively to represent a transformer device, an annual compound interest computing device, and two separate semi-annual compound interest computing devices, all of whose purposes will be described hereinafter.

Each of the tabs 18 is provided with a hole, as holes 19, through which may be projected a pointed device that may be used in the operation of swinging a desired one of the plates 14 outwardly from the others.

Concentrically disposed on each of the forty plates 14 are five circular disks 20, 21, 22, 23 and 24, of thin sheet material, as cardboard, each of a different diameter and all pivotally secured in their concentric positions by a pivot member, as pivot members 25, of eyelet form, which is fixed in the center of each of the plates 14, thereby to adapt the several disks 20, 21, 22, 23 and 24 each to be independently and rotatively moved, and each of said disks is provided with a plurality of holes, as holes 26, disposed at equi-distant points adjacent to its edge, in any one of which holes 26 may be projected a pointed device that may be used in the operation of rotatively moving a desired one of said disks.

All of the disks 20, 21, 22, 23 and 24 of all of the forty plates 14 are each divided by radial lines into ten different divisions and the ten divisions of each of said disks, at corresponding points with respect to the rod 17 and adjacent to the circular edges thereof, are respectively inscribed, each division in its order, with one of the consecutive digits from zero to nine inclusive, said digits on all of the disks 20 having a decimal point placed before them whereby they may indicate tenths of a dollar. Thus the five disks 20, 21, 22, 23 and 24 of each of the plates 14 may each be independently and rotatively moved to dispose a required one of its digits to register with required ones of the digits of the others of said disks to form a row of digits that may represent any required number of dollars and tenths of dollars from zero dollars and zero tenths of dollars to nine thousand nine hundred, ninety nine and nine tenths dollars.

Each of the ten divisions of each of the disks 20 of all the plates 14 is provided with ten holes extending therethrough, which holes are of a form to permit four rows of digits to be seen therethrough and which holes are arranged as shown in Figs. 1 and 9 where, for convenience of illustration, only one division is shown as being provided with such holes though all of such divisions are to be supposed to be so provided.

The ten holes of each of the ten divisions of the disk 20 of the top plate 14 (whose tab contains the numerals 1–10) are numbered respectively from one to ten inclusive which numbers represent time in terms of days.

Each of the ten divisions of each of the disks 21 of all of the plates 14 is provided with ten holes, as shown in Fig. 8, of a form to permit three rows of digits to be seen therethrough and which holes are arranged to register with corresponding portions of the holes in the adjacent disk 20.

Each of the ten divisions of each of the disks 22 of all of the plates 14 is provided with ten holes, as shown in Fig. 7, of a form to permit two rows of digits to be seen therethrough and which holes are arranged to register with corresponding portions of the holes in the disk 20; and each of the ten divisions of each of the disks 23 of all the plates 14 is provided with ten holes, as shown in Fig. 6, of a form to permit one row of digits to be seen therethrough and which holes are arranged to register with corresponding portions of the holes in the disk 20.

The disks 20 of all of the other plates 14 except those of the four plates whose tabs are inscribed respectively with the letters "T R A N S F.," "A. C O M P.," "S. A. C O M P.," and "S. A. C O M P.," have the ten holes of their respective ten divisions numbered consecutively in accordance with the inscriptions on their respective tabs 18; thus the disk 20 of the plate 14 whose tab 18 contains the numerals 11–20 has the ten holes of each of its ten divisions numbered consecutively from eleven to twenty inclusive, and the disk whose tab 18 bears the numerals 21–30 has the ten holes of each of its ten divisions numbered consecutively from twenty one to thirty inclusive; and so on in a like manner the disk 20 of each of the other plates 14, up to and including the plate 14 whose tab 18 bears the numerals 351–360, has its ten holes of each of its ten divisions numbered to represent a different one of progressive periods of ten days each, thus to cover an aggregate number of three hundred and sixty days on the disks 20 of thirty six of said plates 14.

In the present instance all of the disks 20, 21, 22, 23 and 24 of the thirty six plates 14, whose tabs 18 contain numerals representing progressive periods of ten days each, are supposed to be inscribed with numerals which adapt them for use in the operation of computing interest at eight per cent. per annum on sums of money not exceeding nine thousand, nine hundred ninety nine and nine tenths dollars, and characters (8%) representing such rate of eight per cent. are inscribed on the disk 20 of the top one of the plates 14 as shown in Fig. 1; but having computed the amount of interest on a sum of money at eight per cent. for a given number of days, then such amount may be transformed to an amount that may represent the interest on the same sum of money for the same period of time at desired one of other rates of interest from two per cent., inclusive, by means of the disks 20, 21, 22, 23 and 24 of the plate 14 whose tab 18 is inscribed with the letters "T R A N S F."

Annually compounded interest on a principal sum of money for any number of years from two years to ten years inclusive may be computed by means of the disks 20, 21, 22, 23 and 24 of the plate 14 whose tab 18 is inscribed with the letters "A. C O M P."

Semi-annually compounded interest on a principal sum of money for any number of periods of six months within ten years may be computed by means of the disks 20, 21, 22, 23 and 24 of the two plates 14 whose tabs 18 are inscribed with the letters "S. A. C O M P.," the first of said two plates 14 applying to the first five years, and the second of said two plates 14 applying to the second five years of said ten years.

In order to illustrate the operation of computing the interest on a principal sum of money at the rate of 8% per annum for any number of days from one day to ten days inclusive, which operation is performed by utilizing the disks 20, 21, 22, 23 and 24 of the plate 14 whose tab 18 is inscribed with the numerals "1–10" I have arbitrarily selected the principal sum of nine thousand seven hundred and twenty six and five tenths dollars whose numerals are arranged thus 9 7 2 6 .5, and as shown in Fig. 1, the disks 24, 23, 22, 21 and 20 of said plate 14, whose tab 18 is inscribed with the numerals "1–10", are rotatively moved so that their respective marginal numbers 9, 7, 2, 6 and .5 will be lined up in a row, as shown in said Fig. 1 and in Fig. 3, whereupon the ten holes in the several divisions of the disks 20, 21, 22 and 23 will register with each other in the manner hereinbefore described.

In division nine of the disk 24 at a point registering with holes number one in the other disks 23, 22, 21 and 20 is inscribed the numerals 2 which represents two dollars, a sum most nearly representing the interest on nine thousand dollars for one day, at 8 per cent., and in the same division nine of said disk 24 at points registering respectively with the other nine holes of disks 23, 22, 21 and 20, as indicated in Figs. 3 and 5, are inscribed respectively numerals 4, 6, 8, 10, 12, 14, 16, 18 and 20 representing respectively amounts of interest on nine thousand dollars for respective periods of two, three, four, five, six, seven, eight, nine and ten days.

In division seven of the disk 23 at a point registering with holes number one in the other disks 22, 21 and 20 is inscribed numeral 155 which represents fifteen and five tenths cents, a sum most nearly representing the interest at eight per cent. on seven hundred dollars for one day, and in the same division seven of said disk 23 at points registering respectively with the other nine holes of disks 22, 21 and 20, as indicated in Figs. 3 and 6, are inscribed respectively numerals 311, 466, 622, 777, 933, 1088, 1244, 140 and 1555, representing respectively amounts of interest on seven hundred dollars for respective periods of two, three, four, five, six, seven, eight, nine and ten days.

In division two of disk 22 at a point registering with holes number one in disks 21 and 20 is inscribed the numeral 44 which represents forty four hundredths of a cent, a sum most nearly representing the interest at eight per cent. on twenty dollars for one day, and in the same division two of said disk 22 at points registering respectively with the other nine holes of disks 21 and 20, as indicated in Figs. 3 and 7, are inscribed respectively numerals 88, 0133, 0177, 0222, 0266, 0311, 0355, 04 and 0444, representing respectively in decimals of dollars and cents amounts of interest on twenty dollars for respective periods of two, three, four, five, six, seven, eight, nine and ten days.

In division six of disk 21 at a point registering with holes number one in disk 20 is inscribed the numerals 13 which represents thirteen hundredths of a cent, a sum most nearly representing the interest at eight per cent. on six dollars for one day, and in the same division six of said disk 21, at points registering respectively with the other nine holes of the disk 20, as indicated in Figs. 3 and 8, are inscribed respectively, numerals 26, 40, 53, 66, 80, 93, 0106, 0120 and 0133, representing respectively in decimals of a cent amounts of interest on six dollars for respective periods of two, three, four, five, six, seven, eight, nine and ten days.

In division five of the disk 20 adjacent to hole number one is inscribed the numeral 01 which represents one hundredth of one cent, a sum most nearly representing the interest at eight per cent. on five tenths of a dollar for one day, and in the same division five of said disk 20 at points adjacent to the other nine holes therein, as indicated in Figs. 3 and 9, are inscribed respectively numerals 02, 03, 04, 05, 06, 07, 08, 10 and 11, representing in decimals of a cent respectively amounts of interest on five tenths of a dollar for respective periods two, three, four, five, six, seven, eight, nine and ten days.

With the disks 20, 21, 22, 23 and 24, of the plate whose tab is inscribed with the numerals "1–10", thus arranged, it is manifest that the interest on the principal sum of nine thousand seven hundred and twenty six dollars and fifty cents, at eight per cent., for any desired number of days, from one day to ten days inclusive, may be found by adding the numerals associated with a hole representing such desired number of days as shown in Fig. 3.

For instance, by adding the numerals associated with the hole four of Fig. 3 the sum will be eight dollars, sixty four cents and fifty four one hundredths of a cent which will substantially represent the interest at eight per cent. on the sum of nine thousand seven hundred and twenty six dollars and fifty cents for four days, while the interest on the same sum at the same rate of interest for one day would amount substantially to two dollars and sixteen cents and eight hundredths of a cent.

In order to determine what the interest on said sum of nine thousand seven hundred and twenty six dollars and fifty cents would be for a period, say, of 10 days at any one of different rates other than eight per cent., between the rates of two per cent. and twelve per cent. inclusive, it will only be necessary to swing outwardly from the associated plates 14 that one of them whose tab 18 is inscribed with the letters "T R A N S F.," and thereupon rotatively move its disks 20, 21, 22, 23 and 24 so that the zero divisions of disks 24 and 23, the second division of disk 22, the first division of disk 21 and the sixth division of disk 20 will all register with each other to line up in a row the characters 0021.6, as shown in Fig. 10, in which positions the ten holes of such divisions representing respectively different rates of interest, to wit: Two per cent., three per cent., four per cent., five per cent., six per cent., seven per cent., nine per cent. and ten per cent., eleven per cent. and twelve per cent. will be associated with numerals respectively, which added will show sums which respectively will represent the interest on nine thousand seven hundred and twenty six dollars and fifty cents for ten days at each of the respective rates of two per cent., three per cent., four per cent., five per cent., six per cent., seven per cent., nine per cent., ten per cent., eleven per cent. and twelve per cent.

For instance, the interest at twelve per cent. on nine thousand seven hunderd and twenty six dollars and fifty cents for ten days, would be found to be thirty two dollars and forty cents, while the interest on the same sum for the same period of ten days at two per cent. would amount to five dollars and forty cents.

To find the amount of compound interest on nine thousand seven hundred and twenty six dollars and fifty cents at the rate of eight per cent., compounded annually, it will only be necessary to swing outwardly from the associated plates 14 that one of them whose tab 18 is inscribed with the letters "A. C O M P." and dispose its five disks 20, 21, 22, 23 and 24, as shown in Fig. 11, whereupon will be shown the amounts of interest compounded annually at eight per cent. for terms of from two to ten years, as indicated in said Fig. 11, and if it be desired to find the interest on the same sum of nine thousand seven hundred and twenty six dollars and fifty cents, at a different rate than eight per cent. compounded annually, then such amounts, as are shown in Fig. 11, may be transformed to the amount resulting from such different rate by using the disks associated with the plate 14 whose tab 18 is inscribed with the letters "T R A N S F." in the manner hereinbefore described.

To find the amount of compound interest at eight per cent. on nine thousand seven hundred and twenty six dollars and fifty cents compounded semi-annually for terms of one to ten years, then the disks 20, 21, 22, 23 and 24 of the plates 14 whose tabs 18 are inscribed "S. A. C O M P." may be used in an obvious manner, and if it be desired to know what the amount of such compound interest would be at other rates than eight per cent., then the disks of the plate 14 whose tab 18 is marked "T R A N S F." would be used in a manner hereinbefore described.

Manifestly, the proper numerals to be inscribed in their respective positions on all of the divisions of all of the disks 20, 21, 22, 23, and 24 of all of the plates 14 may readily be found by any mathematician.

In Fig. 12, I have illustrated a plate 27 which in form is like the plate 14 and pivotally associated with said plate 27 are two disks 28 and 29 which in form are like the disks 20, 21, 22, 23 and 24.

The disk 28 has its circular marginal portion divided into twelve divisions each of which in inscribed with the name of a different one of the twelve months of a year and each of said twelve divisions is divided into sub-divisions representing the days of its respective month, and the circular marginal portion of the disk 29 (which is smaller in diameter than the disk 28) is divided into three hundred and sixty five divisions representing the days of a year commencing with zero days, which zero point is represented by a hole 30, in which hole 30 a pointed device may be inserted to rotatively move said disk 29.

The purpose of the device thus illustrated in Fig. 12 is to enable one quickly to determine the date upon which a promissory note will mature, the date of such note and its term in days being given; for instance, as shown in Fig. 12, if a note is dated on January 5th then the zero hole 30 would be disposed opposite the division representing January 5th, and if such note is for the term of thirty days it is only necessary to observe where the division mark numbered thirty on the disk 29 is disposed with relation to the sub-division marks on the circular margin of the disk 28 when it will be found that such division number thirty will register with the sub-division representing February 4th, and in like manner if such note was for the term of sixty days it would be seen that it would mature on March 6th, and thus the date of maturity of such note for any number of days from one day to three hundred and sixty five days could be determined in a like manner.

Thus, in all cases it is only necessary to dispose the zero hole 30 opposite any subdivision of any month that represents the date of the note and thereupon observe the location of the division mark on the disk 29 which represents the number of days for which the note is given with respect to the sub-division on the circular margin of the disk 28.

Manifestly, the device illustrated in Fig. 12, may be disposed in pivotal association with the pile of plates 14 and when so disposed will coöperate with the devices associated with the plates 14 in determining the date of maturity of a promissory note and the value of such note on any given date.

What I claim is:

1. A computing device comprising a plurality of superposed sheets mounted on a central pivot, and each sheet bearing interest calculations and having openings therein adapted to be brought into registry, the openings successively decreasing in size downwardly.

2. A computing device comprising a plurality of superposed sheets mounted on a central pivot, and each sheet bearing interest calculations, the said sheets having openings therein adapted to be brought into registry whereby notations on the several sheets may be observed through a single opening in the upper sheet.

3. A computing device including a plurality of superposed sheets, each bearing interest calculations, the sheets above the lower one having openings of successively enlarged areas, the openings in the upper sheet being of a configuration to permit a simultaneous reading of series of numbers in columnar indented formation.

4. A computing device including a plurality of superposed sheets, each bearing interest calculations, the sheets having openings adapted to be brought into registry whereby notations on the several sheets arranged in indented columnar formation may be observed through a single opening in the upper sheet.

In witness whereof, I hereunto subscribe my name this 23 day of May A. D., 1916.

CARL R. RINGS.

Witnesses:
FRANK E. HUNT,
JAMES KEAN.

Copies of this patent may be obtained for five cents each, by addressing the "Commissioner of Patents, Washington, D. C."